United States Patent
Hao et al.

(10) Patent No.: US 9,460,444 B2
(45) Date of Patent: Oct. 4, 2016

(54) VISUAL REPRESENTATION OF A CELL-BASED CALENDAR TRANSPARENTLY OVERLAID WITH EVENT VISUAL INDICATORS FOR MINING DATA RECORDS

(75) Inventors: Ming C. Hao, Palo Alto, CA (US); Umeshwar Dayal, Saratoga, CA (US); Lars-Erik Haug, Gilroy, CA (US); Christian Rohrdantz, Constance (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 1460 days.

(21) Appl. No.: 12/807,378

(22) Filed: Sep. 3, 2010

(65) Prior Publication Data
US 2012/0060080 A1   Mar. 8, 2012

(51) Int. Cl.
G06F 17/00    (2006.01)
*G06Q 30/02*    (2012.01)
G06F 17/24    (2006.01)

(52) U.S. Cl.
CPC ......... *G06Q 30/0203* (2013.01); *G06F 17/246* (2013.01)

(58) Field of Classification Search
CPC .................................................. G06F 17/246
USPC ....................................................... 715/217
See application file for complete search history.

(56) References Cited

U.S. PATENT DOCUMENTS

| 7,181,696 B2 | 2/2007 | Brock |
| 7,418,496 B2 | 8/2008 | Macey |
| 7,424,439 B1 | 9/2008 | Fayyad |
| 2009/0287642 A1 | 11/2009 | Poteet |
| 2009/0306967 A1 | 12/2009 | Nicolov |

OTHER PUBLICATIONS

Hao et al., "Intelligent Visual Analytics Queries", 2007, pp. 1-8.*
Padilla, "iPhone iCal syncing . . . ", 2007, pp. 1-4.*
Hutchison, "Lab Journal: Group Collaboration", 2007, pp. 1-10.*

* cited by examiner

*Primary Examiner* — Shawn S Joseph
(74) *Attorney, Agent, or Firm* — Trop, Pruner & Hu, P.C.

(57) ABSTRACT

A system causes display of a visual representation of a cell-based calendar having cells representing data records, where the cells have corresponding visual indicators corresponding to values of the respective data records. The cells are arranged in plural blocks corresponding to time intervals of the cell-based calendar. Event visual indicators transparently overlay cells in at least some of the plural blocks, where the event visual indicators represent events that occurred in time intervals corresponding to the at least some blocks. The events are separate from activities represented by the data records. Providing the event visual indicators transparently overlaid over the cells in the at least some blocks depict a relationship and relative impact between the data records and the events.

21 Claims, 6 Drawing Sheets
(4 of 6 Drawing Sheet(s) Filed in Color)

VISUAL REPRESENTATION OF A CELL-BASED CALENDAR TRANSPARENTLY OVERLAID WITH EVENT VISUAL INDICATORS FOR MINING DATA RECORDS

BACKGROUND

An enterprise (such as a company, educational organization, government agency, and so forth) can collect or maintain relatively large amounts of data. For example, an enterprise may collect customer feedback in the form of customer surveys. Having to manually analyze relatively large amounts of customer surveys can be a tedious and time-consuming process, and can involve a large number of personnel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

Figure 1:
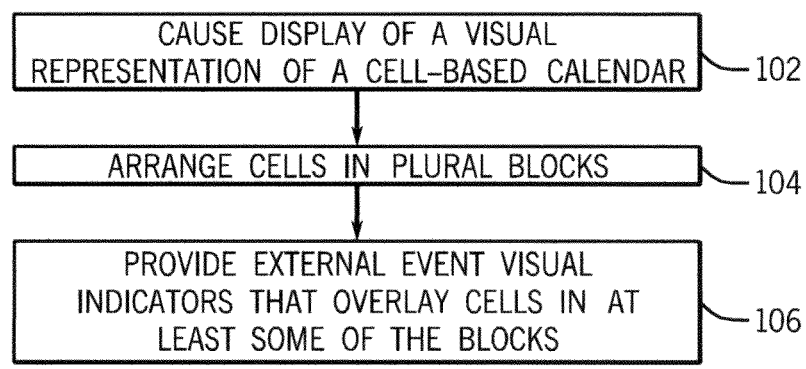
FIG. 1 is a flow diagram of a process according to some embodiments.

Examples of data that can be collected or maintained by an enterprise (e.g., a company, government agency, educational organization, and so forth) include feedback in the form of customer surveys regarding an offering of the enterprise. An offering can be a good or service that is provided by the enterprise to users. In other examples, other types of data collected or maintained by an enterprise include measurement data collected by sensors, logs collected by websites, and so forth.

Understanding relatively large amounts of data can pose a challenge to the enterprise. It is undesirable to have to manually review the relatively large amounts of data on a data record by data record basis. For example, if the collected/maintained data includes customer surveys, it would be undesirable to have to manually review the surveys individually to understand the content of such surveys, as having to review a large number of surveys is time consuming and can involve relatively large amounts of personnel, which can be expensive. Moreover, certain characteristics of data collected or maintained by the enterprise may be caused by external events. An "external event" refers to any event that is separate from the activities represented by data collected or maintained by the enterprise. For example, if the collected/maintained data includes customer surveys, then examples of external events that can affect characteristics of the customer surveys (e.g., customer scores satisfaction or other characteristics) include a promotional sale of offerings by the enterprise, failure or fault of a system (e.g., a website crashing), and so forth. It can be relatively difficult to correlate data representing certain activities of the enterprise with the external events.

In accordance with some embodiments, techniques or mechanisms for mining data are provided to produce a graphical representation of a cell-based calendar (containing cells representing data records of interest) integrated with event visual indicators that represent corresponding external events. In the cell-based calendar, multiple cells are arranged in rows and columns of a calendar. Each cell represents a corresponding data value, such as an attribute of a corresponding data record (e.g., an attribute of a customer survey). Each cell has a visual indicator (e.g., color, shading, shape, etc.) that varies according to the corresponding data value of the data record attribute.

A "cell-based calendar" refers to a data structure that resembles a calendar. For example, a cell-based calendar can include an array of blocks, where each block represents a particular time interval (e.g., day of a month). The cell-based calendar can have multiple rows representing multiple months, and multiple columns representing respective days of each month. More generally, a cell-based calendar is arranged as an array having rows and columns, where a first axis of the cell-based calendar represents first time intervals, and a second axis of the cell-based calendar represents second, different intervals. For example, the first intervals can be months, and the second intervals can be days. In other examples, the first and second time intervals can represent years, quarters, weeks, hours, seconds, and so forth.

Each block of the cell-based calendar includes an arrangement of cells that represent corresponding distinct data records. A characteristic of the arrangement of cells within each block is that the cells are not overlaid with respect to each other such that one cell would obscure or obstruct another cell. For example, within a block, cells can be arranged from bottom to top and left to right according to time. In specific examples, if a block represents a particular day, then all data records corresponding to that particular day are represented by respective cells in that block.

Event visual indicators corresponding to external events can be transparently overlaid over cells in at least some blocks of the cell-based calendar. An event visual indicator "transparently" overlaying cells in a block means that the visual indicators of the cells in the block are visible through the event visual indicator—in some cases, it is possible that the visual indicators of the cells may be somewhat modified by the event visual indicator (such as colors of cells being modified due to the transparent overlaying of a color corresponding to the event visual indicator). In some implementations, the event visual indicators are in the form of transparencies with respective colors, where different transparency colors represent different types of external events. For example, a first type of external event can be a promotional sale. A second type of external event can be failure or fault of a system. A "transparency" refers to a translucent layer that can be provided over an underlying arrangement of cells of the cell-based calendar, where the translucent layer has a particular color. The underlying arrangement of cells remain visible through the translucent layer.

At the same time that the underlying cell colors are visible to the user, the color of the transparency is also apparent to the user, such that the user can view both the visual indicator of the external event as well as visual indicators (in the form of cells of different colors, for example) of respective values of data records. In this manner, the user is able to identify the relationship and relative impact between activities represented by the underlying cells and the external events represented by the corresponding event visual indicator. The identified "relationship" between activities represented by the cells and external events can be a time-based relationship. The time-based relationship is specified by overlaying a transparency over cells in a particular block, such that a viewer can easily determine that the external event occurred in the same time interval (e.g., day) as the activities represented by the underlying cells of the block. In other implementations, other types of relationships can be ascertained based on relative positioning of a transparency with respect to a block (or blocks) of underlying cells.

The "relative impact" between activities (represented by the underlying cells) and the external events is indicated by the visual indicators of the underlying cells and the transparency color. For example, if the underlying cells have cell visual indicators that indicate customer dissatisfaction (e.g., low customer survey scores), the user can determine, based on the color of the transparency layer over the underlying cells, the type of external event that may have resulted (the determined "relative impact") in the customer dissatisfaction. In this way, the user can easily ascertain the relationship and relative impact between activities represented by cells and the external event.

Although reference is made to a transparency color that is used as a visual indicator for an external event, it is noted that other types of visual indicators can be used in other implementations for representing external events. For example, different visual indicators for the external events can include different brightnesses that are overlaid over cells in a block (or blocks) of underlying cells. The different brightnesses of the transparency can represent different types of events. As another example, the visual indicator for an external event can correspond to a different color frame around a block.

FIG. 1 is a flow diagram of a process according to some embodiments. A system causes (at 102) display, on a display device, of a visual representation of a cell-based calendar having cells representing data records, where the cells have corresponding visual indicators (e.g., colors) corresponding to values of the respective data records. The cells are arranged (at 104) in plural blocks corresponding to time intervals of the calendar. Event visual indicators are provided (at 106) that overlay cells in at least some of the blocks, where the event indicators represent external events that occurred in time intervals corresponding to the at least some blocks.

Figure 2:
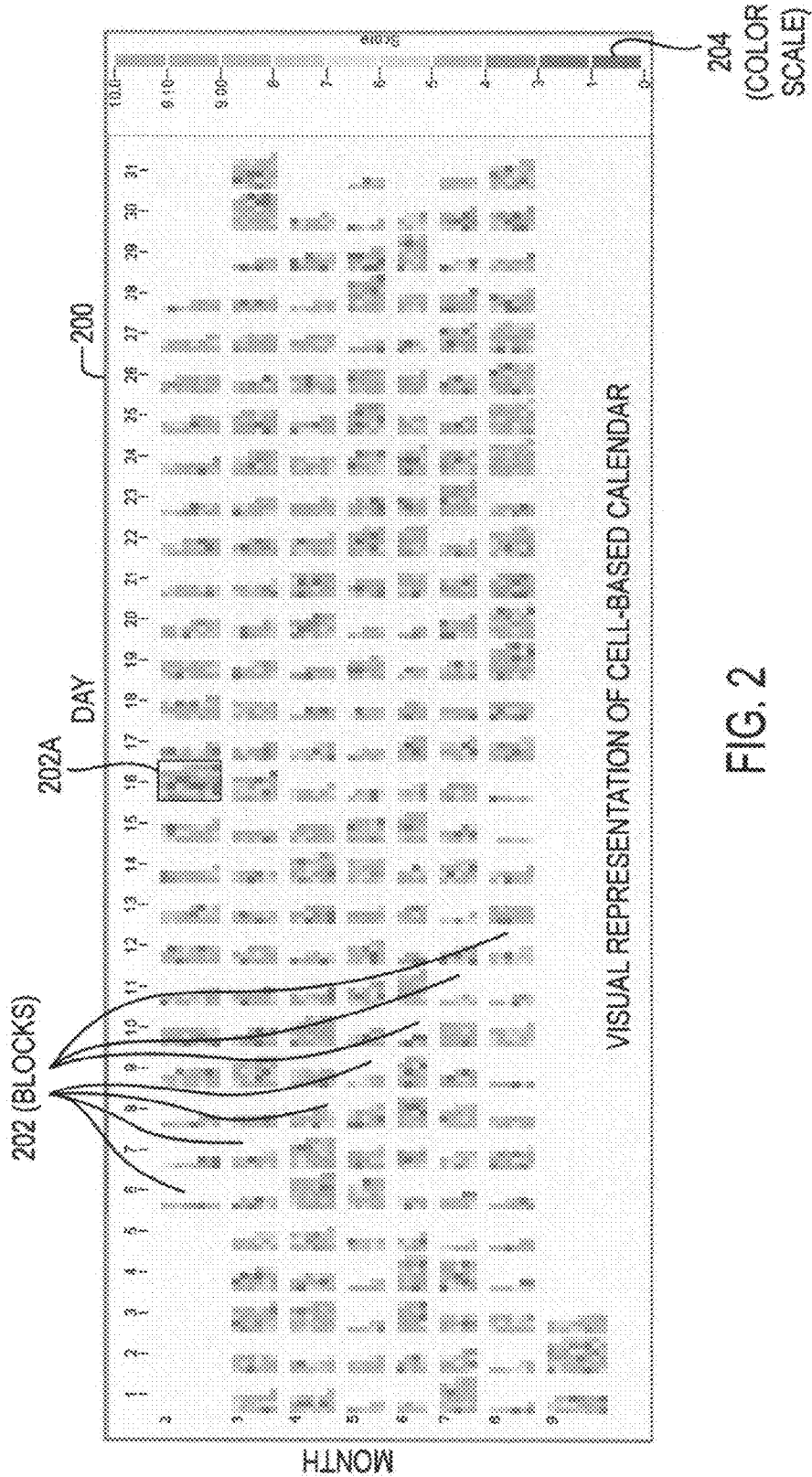
FIG. 2 illustrates a graphical visualization of a cell-based calendar generated by a system according to some embodiments.

FIG. 2 illustrates an example visual representation 200 containing a cell-based calendar as generated by a system according to some implementations. In the cell-based calendar depicted in FIG. 2, the rows of the cell-based calendar represent months, whereas the columns of the cell-based calendar represent days. In other examples, the first and second axes of the cell-based calendar can represent other different time intervals (e.g., a row can correspond to a year, month, day, etc., and a column can correspond to an hour, minute, etc.).

The cell-based calendar has an array of blocks 202, where each block 202 is at the intersection of a row and column of the cell-based calendar. Each block represents a particular day of a particular month in some examples. Data records associated with a particular day of a particular month are represented by cells in the corresponding block 202. For example, data records for February 16$^{th}$ are represented by cells in block 202A. Although each block 202 in FIG. 2 is generally rectangular, note that a block can have other shapes in other implementations.

The cells within each block 202 are assigned colors based on at least one attribute of the corresponding data records. The color assigned is based on a color scale 204 that is also depicted in the visual representation 200. In the example cell-based calendar of FIG. 2, the attribute of interest is a customer satisfaction score, where zero is the lowest score (indicating customer dissatisfaction) and 10.0 is the highest score (indicating customer satisfaction). Higher scores are represented by green, whereas the lower scores are represented by red, with intermediate scores represented by other colors. In other implementations, the different colors can represent different types of attributes of data records.

Within each block, the cells are arranged in time order (e.g., arrival time, time associated with timestamp, etc.) starting from the bottom left corner and proceeding to the upper right corner, in some examples. Multiple cells corresponding to multiple data records within each block 202 are visible to a user (in other words, the cells do not overlay each other so one cell does not obscure or obstruct another cell).

Each row of blocks 202 represents a time series of data records. In alternative implementations, each column of blocks can represent a time series of data records.

Figure 3:
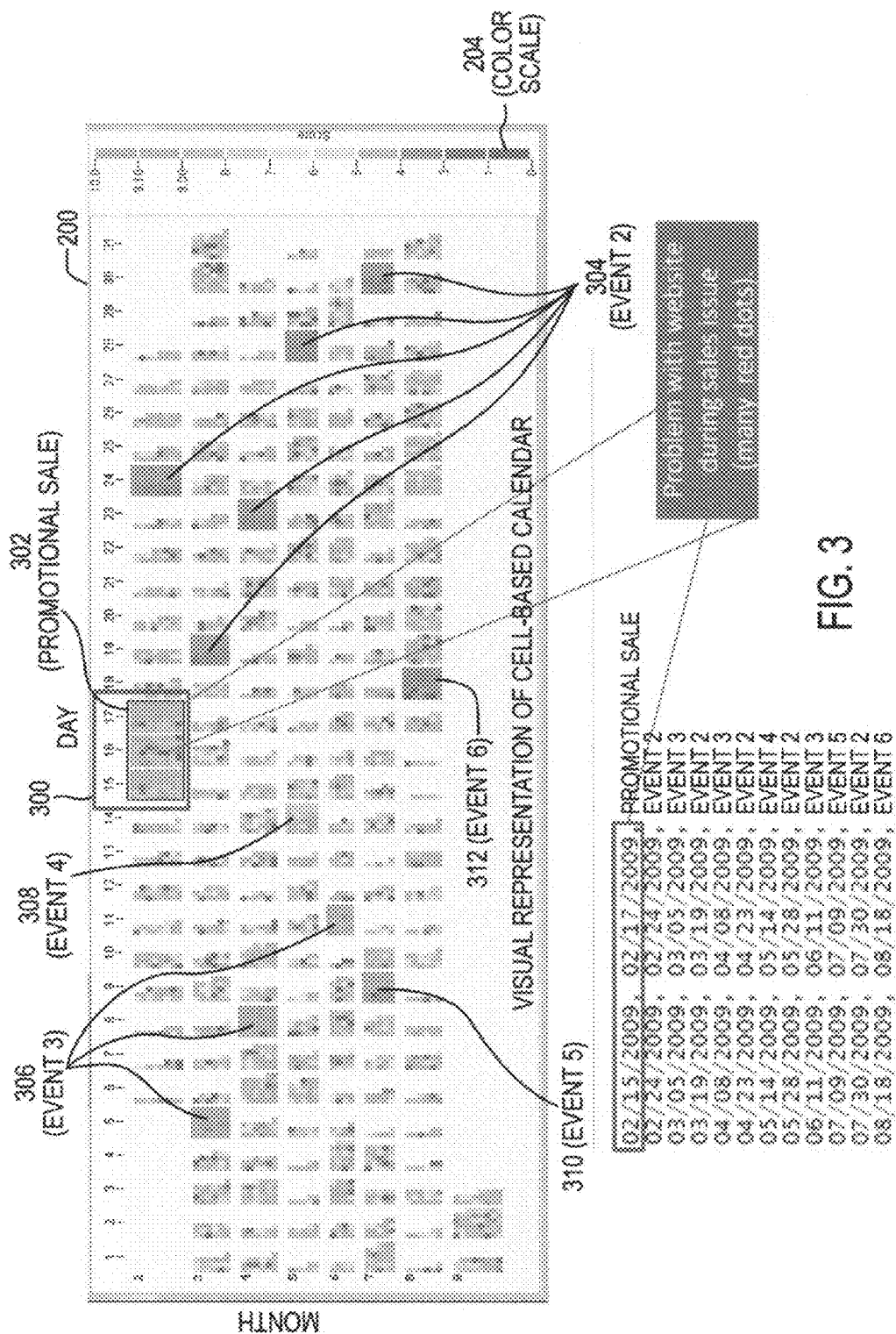
FIG. 3 illustrates a graphical visualization of a cell-based calendar integrated with event indicators in accordance with some embodiments.

FIG. 3 shows the visual representation 200 of FIG. 2 overlaid with event visual indicators (representing external events) in the form of transparencies having respective colors. Note that not all of the blocks 202 are overlaid with event visual indicators. In the example of FIG. 3, transparencies are overlaid over cells in some of the blocks 202. The event visual indicators depicted in FIG. 3 include event visual indicators 302, 304, 306, 308, 310, and 312. The event visual indicators sharing the same reference numerals have the same transparency color. Thus, in the example of FIG. 3, there are three event visual indicators 306 (sharing one transparency color) and five event visual indicators 304 (sharing another transparency color). The different transparency colors represent different types of events. For example, event visual indicator 302 represents a promotional sale offered by an enterprise for offering(s) of the enterprise.

The table below lists the various different types of events that are represented by the event visual indicators of FIG. 3, according to some examples.

| Start Date | End Date | External Event Name |
|---|---|---|
| 2/15 | 2/17 | Promotional Sale |
| 2/24 | 2/24 | Event 2 |
| 3/5 | 3/5 | Event 3 |
| 3/19 | 3/19 | Event 2 |
| 4/8 | 4/8 | Event 3 |
| 4/23 | 4/23 | Event 2 |
| 5/14 | 5/14 | Event 4 |
| 5/28 | 5/28 | Event 2 |
| 6/11 | 6/11 | Event 3 |
| 7/9 | 7/9 | Event 5 |
| 7/30 | 7/30 | Event 2 |
| 8/18 | 8/18 | Event 6 |

In the above table, the first column represents the start date of a particular external event, the second column represents the end date of a particular external event, and the third column represents the external event name to identify the type of event. The first event listed in the table above is a promotional sale event that has a start date of February 15 and an end date of February 17. The event visual indicator corresponding to this event is event visual indicator 302 in FIG. 3, which overlays cells in blocks 202 on February 15$^{th}$-February 17$^{th}$. The above table indicates that Event 2 (which represents a different type of event) occurred on February 24, March 19, April 23, May 28, and July 30. Event 2 occurring on the five different dates are represented by the five occurrences of event visual indicators 304 in FIG. 3.

The above table indicates that Event 3 occurred on March 5, April 8 and June 11. Event visual indicators corresponding to the three occurrences of Event 3 are represented as event visual indicators 306 in FIG. 3.

The other event visual indicators 308, 310, and 312 represent Event 4 (on May 14), Event 5 (on July 9) and Event 6 (on August 18), respectively.

In accordance with some implementations, the placement of an event visual indicator for a corresponding external event is based on a time of occurrence of the corresponding event. Thus, since the promotional sale in the above table occurred on February 15-February 17, the event visual indicator (302) for the promotional sale overlays cells in blocks of the cell-based calendar on those days.

By correlating the positioning of event visual indicators according to times of occurrence of the corresponding external events, a user can more easily visualize the relationship and relative impact between such external events and characteristics of corresponding data records represented by the blocks over which the event visual indicators overlay.

The visual representation 200 of FIG. 3 can be an interactive visual representation that allows mining of the data records without having to individually read the data records. In some implementations, a user is able to drill down into a selected portion of the visual representation 200. For example, a user can select a user-selectable box 300 (such as a rubber-banded box produced by using a rubber banding operation of a mouse or other pointing device or by manipulating a touch screen) that covers blocks of the cell-based calendar corresponding to February 15 to February 17. This is an indication that the user desires to view further details regarding the content that is represented within the box 300.

Figure 4:
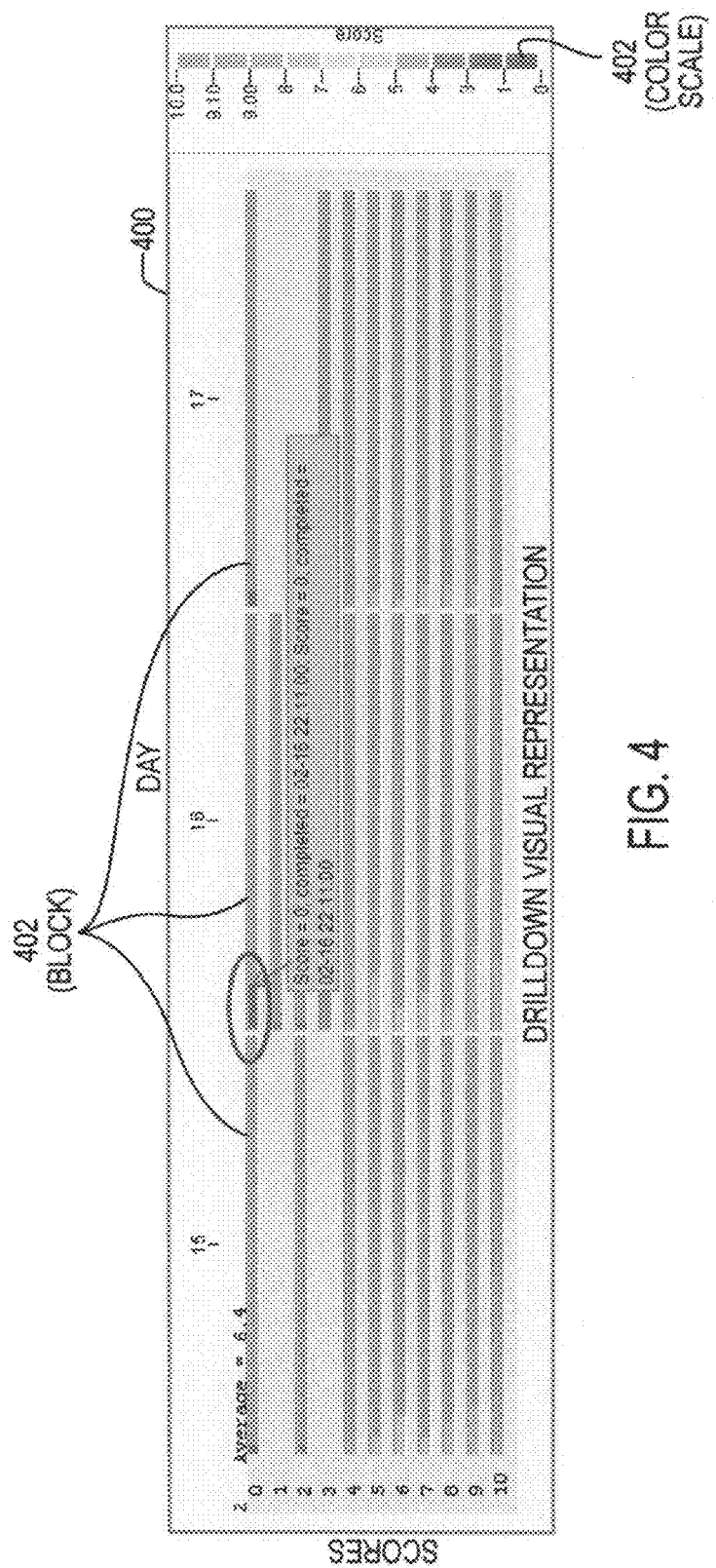
FIG. 4 illustrates a graphical representation of a drilled down portion of the graphical visualization of FIG. 3, in accordance with some embodiments.

FIG. 4 is another visual representation 400 that depicts further details regarding the content of the box 300 selected by the user in the visual representation 200 of FIG. 3. The columns of the visual representation 400 represent days, which in this example are February 15, February 16, and February 17, respectively. However, the rows of the visual representation 400 represent a different attribute than the rows of the visual representation 200 of FIG. 3. Whereas the rows of the visual representation 200 represent months, the rows of the visual representation 400 represent customer satisfaction scores. The ability to change attributes to be visualized in the drilldown visual representation 400 allows the user to visualize different details to better understand the content of the selected blocks 300.

In the example visual representation 400 depicted in FIG. 4, a particular block 402 contains indicators of data records having a particular score on a particular day. For example, the block 402 in the first row in the first column contains an indicator of a data record having score zero on February 15. In this example, there is only one occurrence of such data record. On the other hand, in the block 402 in the first row, second column of the visual representation 400, more indicators are provided to indicate that more data records having score zero were received on February 16.

In this way, the user can easily see the number of occurrences of each score (0 to 10) on any particular day, by viewing the number of indicators in the respective block 402.

Figure 5:
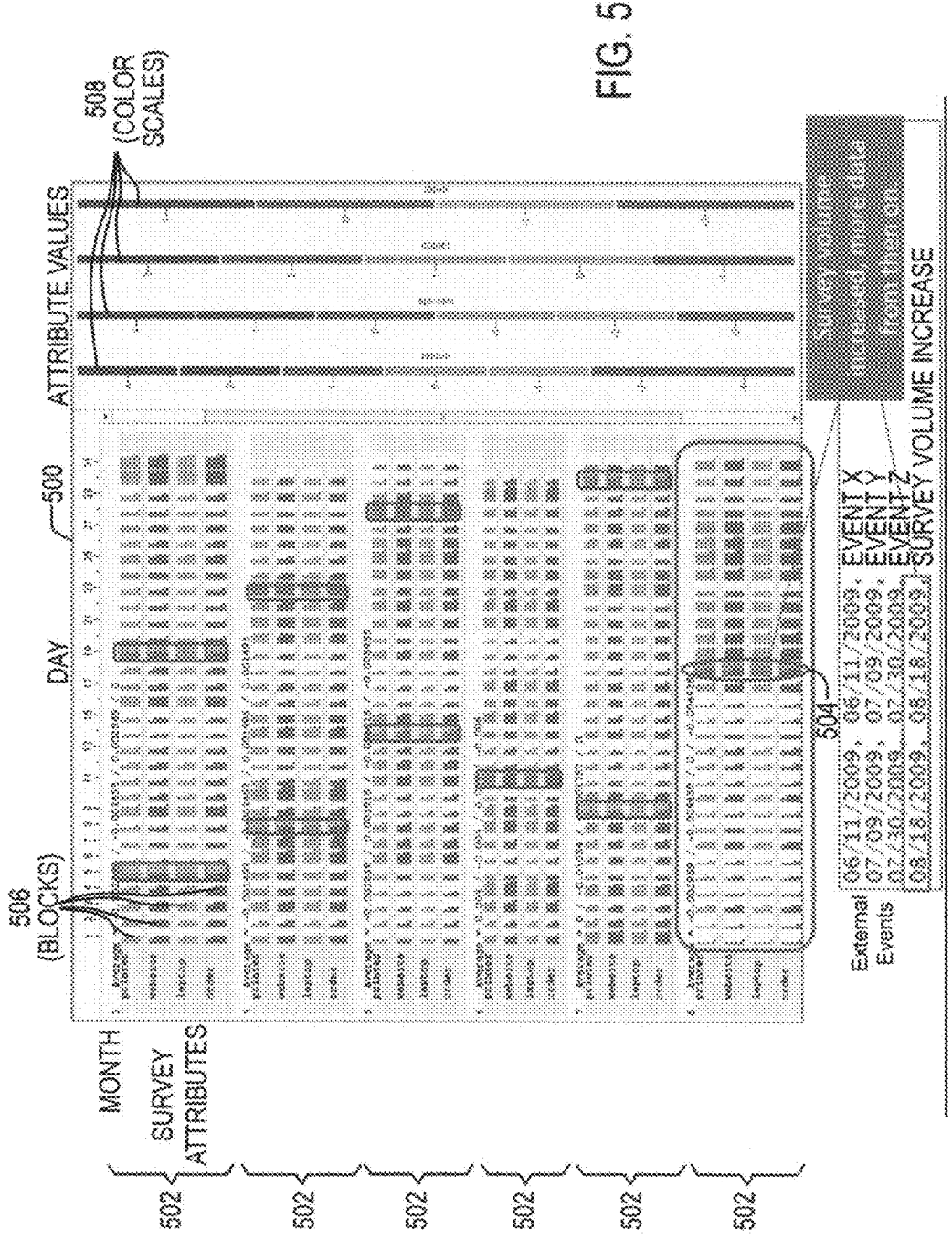
FIG. 5 illustrates a graphical visualization of a cell-based calendar integrated with event indicators, according to alternative embodiments.

The visual representation 200 of FIG. 3 has cells that represent just one attribute of corresponding data records. In alternative implementations, multiple attributes of data records can be represented. FIG. 5 is a visual representation 500 that visualizes multiple attributes of each data record. The main rows 502 of the visual representation 500 depict months, in the example of FIG. 5, while the columns of the visual representation 500 represent days. Within each main row 502, there are sub-rows (or segments) 504 that represent respective different attributes (e.g., representing different activities or entities) of data records that are being visualized. In the example of FIG. 5, these attributes represented by respective sub-rows 504 are attributes relating to printer, website, laptop, and order.

The intersection of each sub-row and a column is a block 506 of cells that represent the corresponding attribute of the data records occurring at the particular month and day. In the example of FIG. 5, four color scales 508 are provided for the four different attributes.

FIG. 5 also shows event visual indicators overlaid on certain groups of blocks. In the case of FIG. 5, each event visual indicator is overlaid over cells in blocks corresponding to the four attributes. Event visual indicator 504 corresponds to an event occurring on August 18, relating to "survey volume increase."

Figure 6:
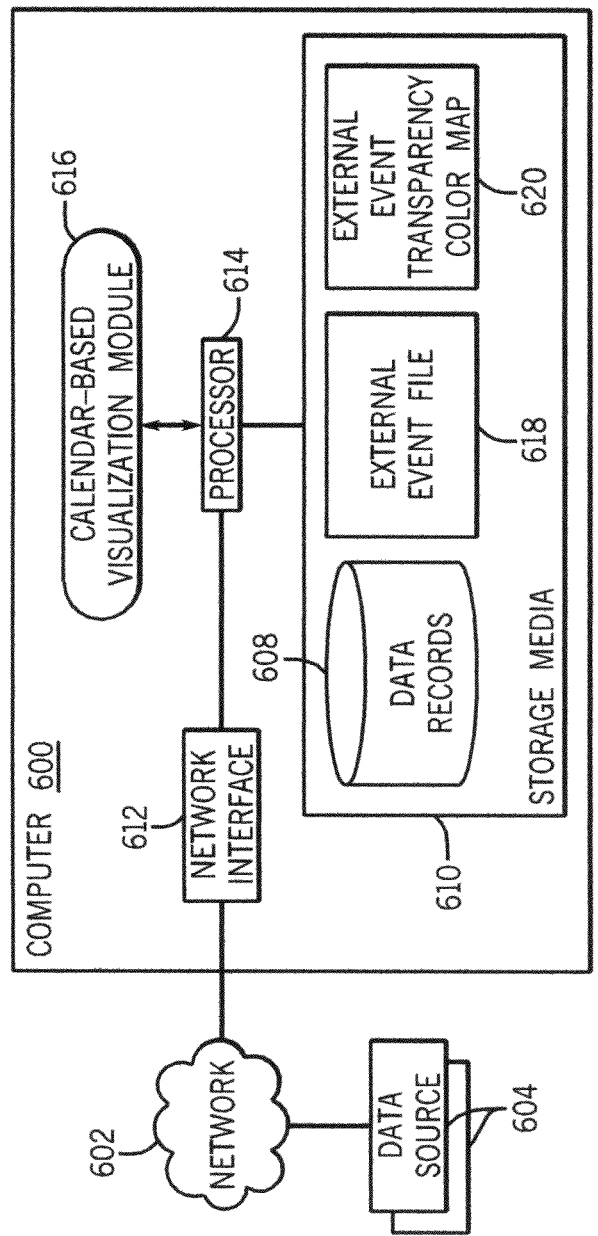
FIG. 6 is a block diagram of an example system incorporating some embodiments.

FIG. 6 is a block diagram of an example system that includes a computer 600 coupled over a network 602 to various data sources 604. The data sources 604 collect data records that are entered into the computer 600. The visualization of data records received from the data sources 604 can be performed on a real-time basis. Real-time visualization of data records refers to visualizing such data records as the data records are received. In alternative implementations, instead of performing real-time visualization of data records, the data records can be first stored, such as in a database 608 in storage media 610, and such data records can be visualized at the later time.

The computer 600 has a network interface 612 to communicate over the network 602, where the network interface 612 is connected to a processor (or multiple processors) 614. A calendar-based visualization module 616 is executable on the processor(s) 614 to perform the tasks of FIG. 1 and to present various visual representations as discussed above. The visual representations can be displayed in a display device (not shown) coupled to the computer 600.

External events detected by the computer 600 are stored in an external event file 618 in a storage media 610. The storage media 610 also contains an external event transparency color map 620 that maps different types of external events to different transparency colors. In alternative implementations, the computer 600 is also able to detect, external events as they are triggered. In response to detecting new external events, the computer 600 can provide the detected external events to the calendar-based visualization module 616 to cause corresponding event visual indicators to be added to a respective visual representation.

The calendar-based visualization module 616 can include machine-readable instructions that are loaded for execution on processor(s) 614. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for mining data records comprising:
   causing, by a system having a processor, display of a visual representation of a cell-based calendar having cells representing the data records, wherein the cells have corresponding visual indicators corresponding to values of the respective data records;
   arranging the cells in plural blocks corresponding to time intervals of the cell-based calendar; and
   providing event visual indicators that transparently overlay cells in at least some of the plural blocks, wherein the event visual indicators represent events that occurred in time intervals corresponding to the at least some blocks, wherein the events are separate from activities represented by the data records, and wherein providing the event visual indicators transparently overlaid over the cells in the at least some blocks depict a relationship and relative impact between the data records and the events.

2. The method of claim 1, wherein the cell-based calendar has rows and columns, wherein the rows represent first time intervals, and the columns represent sub-intervals of the first time intervals.

3. The method of claim 1, further comprising allowing interaction with the visual representation of the cell-based calendar that allows for mining of the data records without having to individually read the data records.

4. The method of claim 1, wherein providing the event visual indicators comprises providing transparencies over the at least some blocks, the transparencies having respective different colors to represent different types of the events.

5. The method of claim 4, wherein the visual indicators of the cells comprise different colors to represent corresponding different values of the data records.

6. The method of claim 1, wherein the blocks are arranged into plural segments that correspond to different attributes in the data records over time.

7. The method of claim 1, wherein the data records correspond to customer surveys, and wherein displaying the visual representation of the cell-based calendar allows for an understanding of feedback provided in the customer surveys without having to read the customer surveys individually, and wherein the cells in the at least some blocks have different visual indicators based on respective different values of an attribute in the corresponding customer surveys.

8. The method of claim 1, further comprising:
   receiving a selection to drill down into a portion of the cell-based calendar; and
   causing display of a second visual representation of the portion, wherein the second visual representation has at least one axis that differs from a corresponding axis of the cell-based calendar.

9. An article comprising at least one non-transitory computer-readable storage medium storing instructions that upon execution cause a computer to:
   present for display a first visual representation of a calendar having a first axis representing first time intervals and a second axis representing second time intervals, wherein the calendar has blocks of cells, and wherein the cells have respective visual indicators representing corresponding values of corresponding activities;
   integrate, into the first visual representation, event visual indicators that represent respective events, wherein the event visual indicators are transparently overlaid over the cells in respective ones of at least some of the blocks;
   receive a selection to drill down into a portion of the calendar; and
   present for display a second visual representation of the portion, wherein the second visual representation has a first axis and a second axis at least one of which differs from the corresponding first axis and second axis of the calendar.

10. The article of claim 9, wherein the instructions upon execution cause the computer to further:
    detect additional events; and
    add additional event visual indicators to the first visual representation for the respective detected additional events.

11. The article of claim 9, wherein the event visual indicators are transparency colors, and the visual indicators of the cells are colors corresponding to values of an attribute corresponding to the activities.

12. The article of claim 9, wherein the event visual indicators overlaying the cells in the at least some blocks provide a depiction of a relationship and relative impact between the activities and the events that are external to the activities.

13. The article of claim 9, wherein the instructions upon execution cause the computer to further:
    receive data records containing the values of corresponding activities,
    wherein presenting for display the first visual representation comprises performing real-time display of the data records in the first visual representation.

14. The article of claim 9, wherein the event visual indicators that represent respective events comprise different transparency colors, wherein the different transparency colors represent corresponding different types of events.

15. The article of claim 9, wherein each of the event visual indicators overlays cells in at least one of the blocks based on a time associated with the corresponding event.

16. The article of claim 9, wherein the calendar has plural rows, wherein each row has multiple sub-rows containing cells for respective multiple, different attributes.

17. The article of claim 16, wherein each of the sub-rows has plural ones of the blocks that contain cells of a corresponding one of the attributes, and wherein one of the event visual indicators overlays cells in a group of the blocks for the multiple attributes.

18. A system comprising:
  at least one processor; and
  a calendar-based visualization module executable on the at least one processor to:
    cause display of a visual representation of a cell-based calendar having cells representing data records, wherein the cells have corresponding visual indicators corresponding to attribute values of the respective data records;
    arrange the cells in plural blocks corresponding to time intervals of the cell-based calendar; and
    provide event visual indicators that transparently overlay the cells in at least some of the plural blocks, where the event visual indicators represent external events separate from activities represented by the data records, wherein positioning of the event visual indicators is based on time of occurrence of the corresponding events, and where providing the event visual indicators transparently overlaid over the cells in the at least some blocks depicts a relationship and relative impact between the data records and the events.

19. The system of claim 18, wherein the event visual indicators comprise transparency colors, wherein a transparency color overlaid over cells in a particular one of the at least some blocks allows the cells of the particular block to be visible through the transparency color.

20. The system of claim 18, wherein different transparency colors represent different types of external events.

21. The method of claim 1, further comprising:
  receiving, by the system, the data records from at least one data source over a network.

* * * * *